United States Patent [19]

Lindblom

[11] Patent Number: 4,558,608
[45] Date of Patent: Dec. 17, 1985

[54] CUTTERHEAD REVERSING DRIVE FOR FORAGE HARVESTERS

[75] Inventor: Curtis H. Lindblom, New Holland, Pa.

[73] Assignee: Sperry Corporation, New Holland, Pa.

[21] Appl. No.: 452,003

[22] Filed: Dec. 21, 1982

[51] Int. Cl.$^4$ .............................................. F16H 3/14
[52] U.S. Cl. ...................................... 74/376; 474/144; 192/67 P; 56/12.1
[58] Field of Search ................. 74/376, 377, 15.4, 608; 192/48.5, 48.8, 67 P; 474/144; 56/12.1

[56] References Cited

U.S. PATENT DOCUMENTS

| | | | |
|---|---|---|---|
| 1,442,057 | 1/1923 | Eggert | 74/376 |
| 2,953,034 | 9/1960 | Weaver | 74/376 |
| 3,583,242 | 6/1971 | Thornbloom | 74/15.4 |
| 3,677,316 | 7/1972 | Markham | 56/12.1 |
| 3,678,772 | 7/1972 | Pedersen et al. | 74/203 |
| 3,730,441 | 5/1973 | Waldrop et al. | 241/60 |
| 3,732,740 | 5/1973 | Fell et al. | 74/15.2 |
| 3,766,794 | 10/1973 | Wilcox | 192/67 P |
| 3,889,887 | 6/1975 | Wagstaff et al. | 241/102 |
| 4,455,812 | 6/1984 | James | 192/48.8 |

FOREIGN PATENT DOCUMENTS

| | | | |
|---|---|---|---|
| 440255 | 4/1912 | France | 192/67 P |
| 1074646 | 10/1954 | France | 192/67 P |
| 380878 | 6/1940 | Italy | 74/376 |
| 515425 | 2/1955 | Italy | 74/376 |
| 510212 | 7/1939 | United Kingdom | 74/376 |

*Primary Examiner*—Leslie A. Braun
*Assistant Examiner*—Dirk Wright
*Attorney, Agent, or Firm*—Darrell F. Marquette; Frank A. Seemar; Larry W. Miller

[57] ABSTRACT

A drive apparatus is provided for driving the cutterhead of a forage harvester forward and in reverse. The drive apparatus comprises a hub mounted at one end of a transverse shaft that drives the cutterhead. The hub is connected to and movable along this transverse shaft between a driving position and a non-driving position with respect to another transverse shaft that is connected to a tractor PTO. The cutterhead may be driven forward when the hub is in the driving position and in reverse when the hub is in the non-driving position. A removable belt may be utilized to drive the cutterhead in reverse.

5 Claims, 8 Drawing Figures

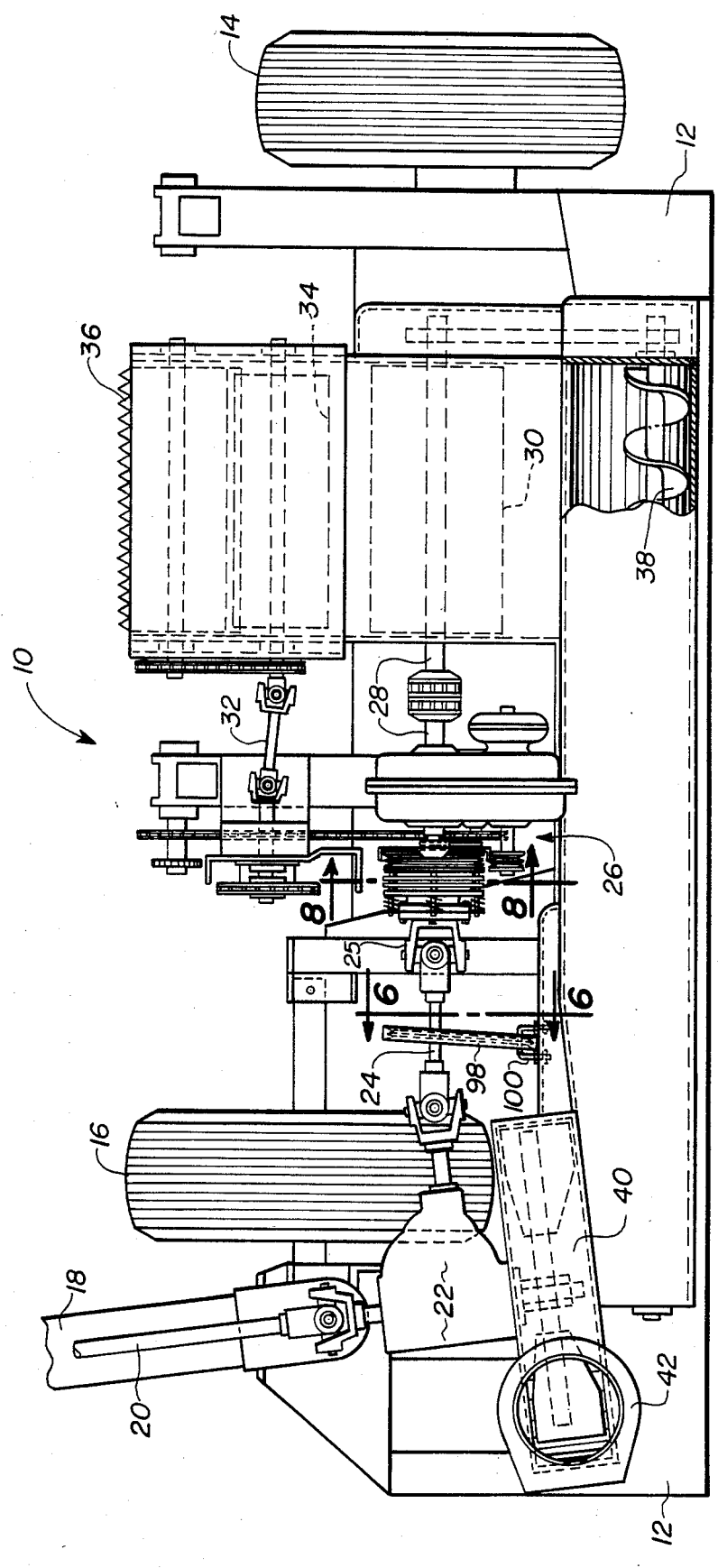
Fig. 1
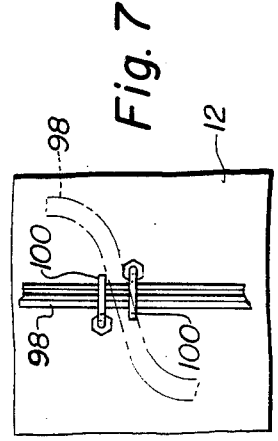
Fig. 7
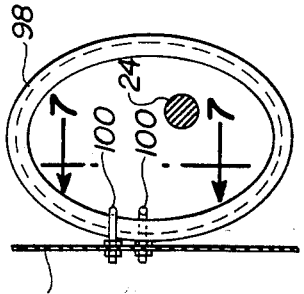
Fig. 8
Fig. 6

Fig. 4
Fig. 5
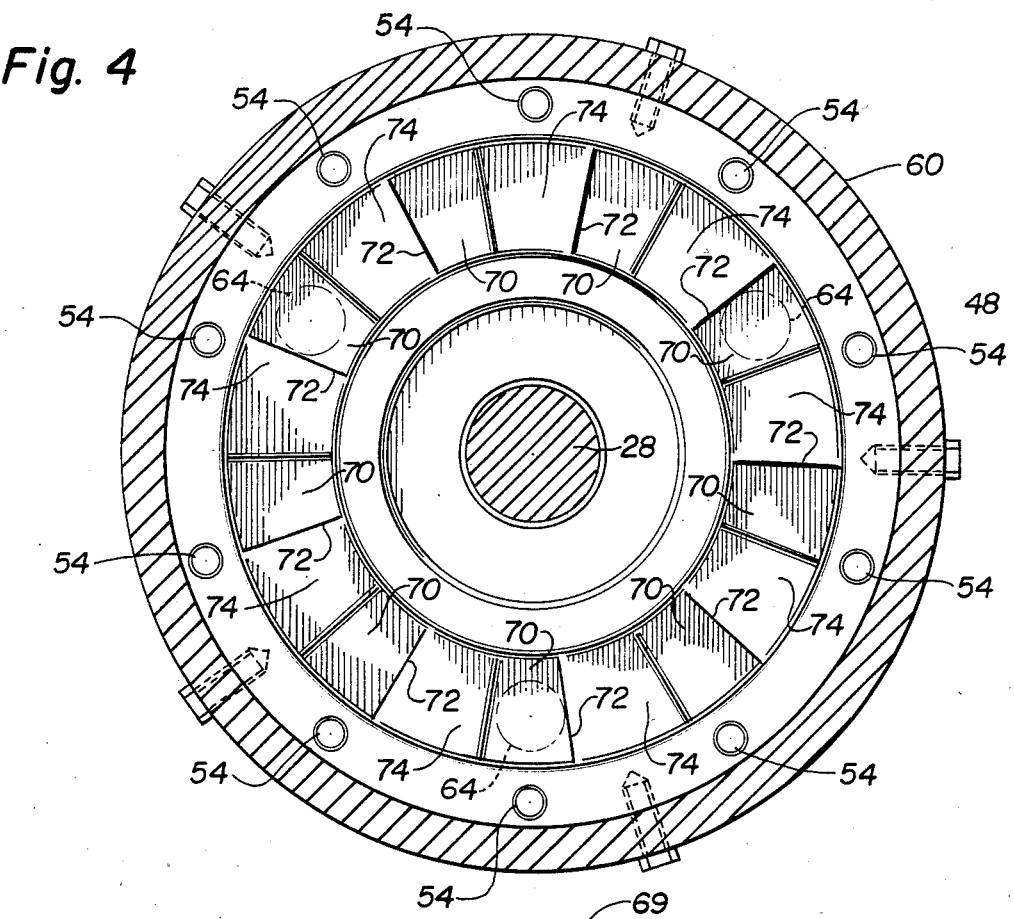
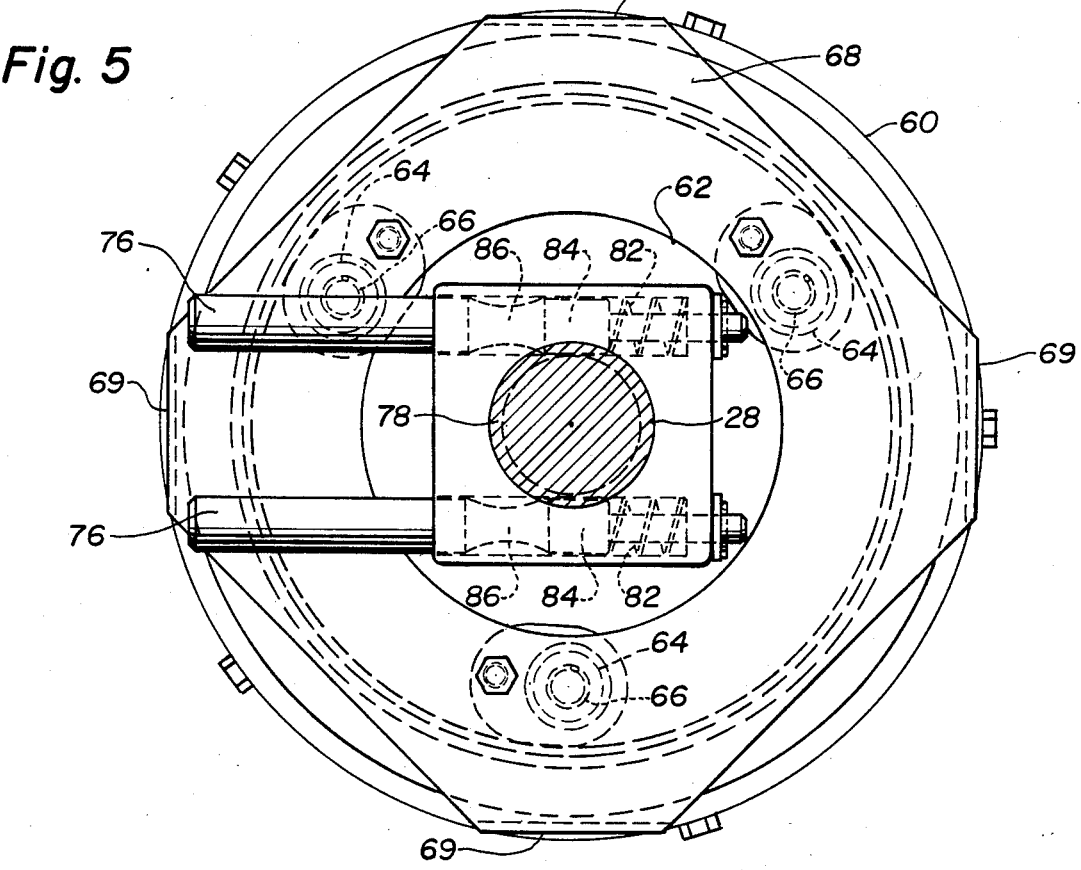

CUTTERHEAD REVERSING DRIVE FOR FORAGE HARVESTERS

BACKGROUND AND SUMMARY OF THE INVENTION

It has become acceptable to drive the cutterhead of a forage harvester in reverse while sharpening the knives of the cutterhead. U.S. Pat. No. 3,889,887 discloses one type of apparatus which has been used to reverse drive a cutterhead. With this type of apparatus, the main driveline is uncoupled from the cutterhead shaft and then coupled to an auxiliary or idler shaft in order to drive the cutterhead in reverse. In large forage harvesters, it is difficult to move the main driveline from one shaft to another shaft due to the size and weight of the main driveline.

The present invention overcomes this problem by providing drive means for a forage harvester wherein it is not necessary to move the main driveline from one shaft to another shaft to reverse drive the cutterhead. The drive means of the present invention comprises means mounted at the end of the cutterhead shaft. The which includes a hub connected to and movable along the cutterhead shaft between a driving position and a non-driving position with respect to the main driveline. The cutterhead may be driven forward when the hub is in the driving position and in reverse when the hub is in the non-driving position.

In the preferred embodiment of the present invention, the drive means also comprises a gearbox located between the hub clutch and the cutterhead with the cutterhead shaft passing through the gearbox. The gearbox contains two spur gears in meshing engagement, and one of the spur gears is fixed to the cutterhead shaft. The cutterhead may be driven in reverse through the two spur gears when the hub is in the non-driving position.

BRIEF DESCRIPTION OF THE DRAWINGS

FIG. 1 is a plan view of a forage harvester embodying the preferred embodiment of the present invention;

FIG. 4 is an enlarged sectional view taken along lines 4—4 in FIG. 2;

FIG. 5 is an enlarged sectional view taken along lines 5—5 in FIG. 2;

FIG. 6 is an enlarged sectional view taken along lines 6—6 in FIG. 1;

FIG. 7 is a view taken along lines 7—7 in FIG. 1; and

FIG. 8 is a somewhat schematic view taken along lines 8—8 in FIG. 1.

DESCRIPTION OF THE PREFERRED EMBODIMENT

Figure 2:
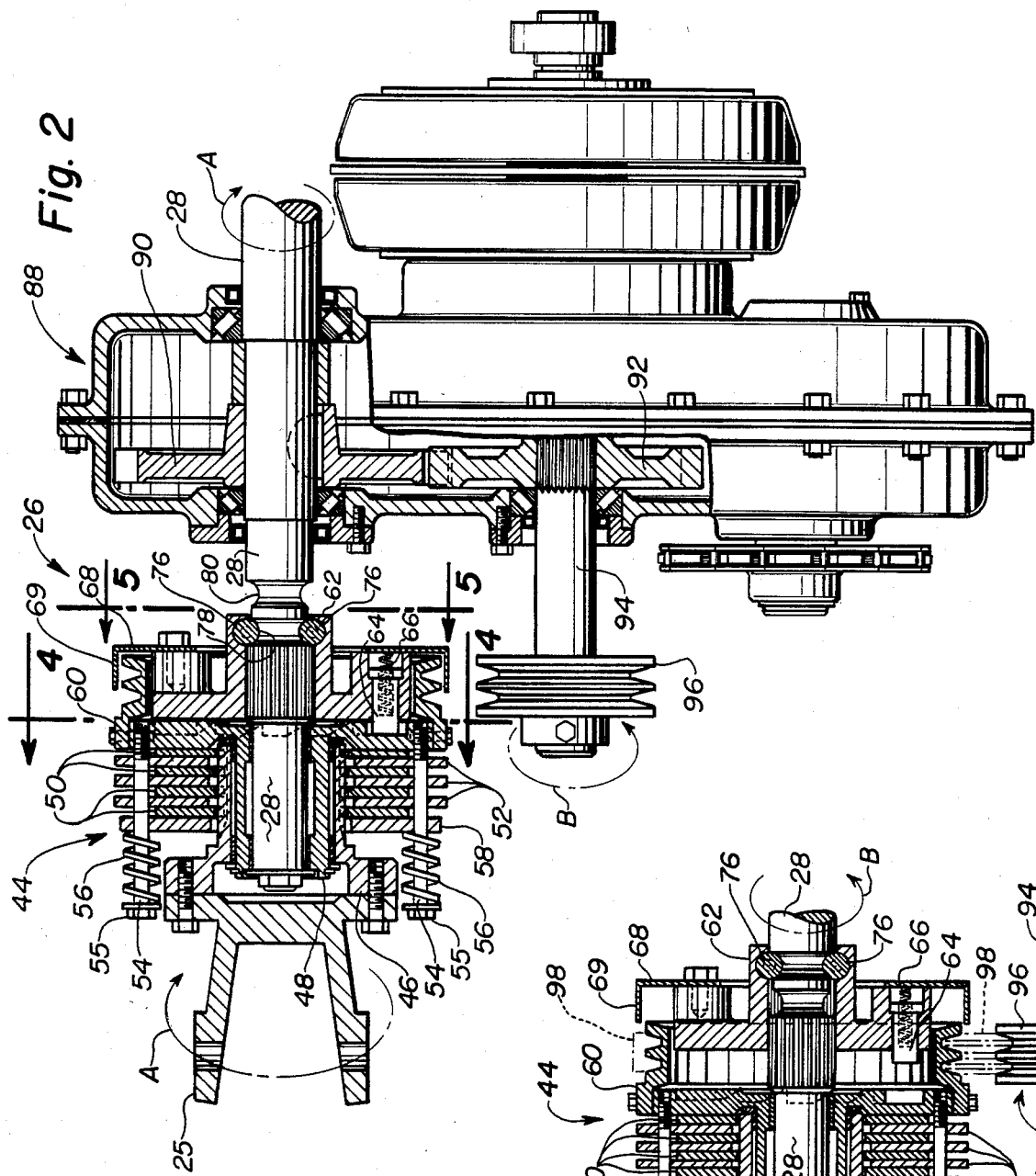
FIG. 2 is an enlarged view of a portion of the forage harvester of FIG. 1 with the drive parts in position for driving the cutterhead forward.

Referring to FIG. 1, a forage harvester 10 includes a base frame 12 supported by wheels 14 and 16. A tongue 18 is pivotally mounted on the base frame 12 for connection to a tractor (not shown). An input drive shaft 20 is adapted for connection to the PTO of a tractor. The input drive shaft 20 delivers power through a gear case 22 to a transverse shaft 24 which is connected to a clutch and gearbox arrangement 26. Another transverse shaft 28 extending from the clutch and gear box arrangement 26 drives a cutterhead 30. A further shaft 32 is driven from the clutch and gearbox arrangement 26 by a series of sprockets and chains (not shown in entirety in FIG. 1). The shaft 32 in turn drives feed rolls 34,36 which deliver crop material to the cutterhead 30. An auger 38 delivers cut crop material from the cutterhead 30 across the base frame 12 to a blower unit 40 which is driven from the gear case 22. The blower unit 40 delivers the cut crop material outwardly through a discharge spout 42.

The clutch and gearbox arrangement 26, as shown in FIG. 2, includes an overrunning slip clutch 44 mounted on the shaft 28. The clutch 44 has an annular member 46 bolted to the universal joint yoke 25 at the end of the shaft 24. Another annular member 48 is rotatably mounted on bearings located between the shaft 28 and the annular member 46. Discs 50 are splined to the annular member 46, and other discs 52 are sandwiched between the discs 50. Bolts 54 extend through the discs 52 and are threaded into the annular member 48. Compression springs 56 are disposed on the bolts 54 between the heads 55 thereof and a ring member 58. The springs 56 urge the discs 50 and 52 into firm engagement with each other so that the annular members 46 and 48 are normally rotated together.

The clutch 44 also includes a pulley 60 which is bolted to the annular member 48. A hub 62 is splined on the shaft 28 and carries pins 64 that are normally urged toward the annular member 48 by springs 66. A shield member 68 is bolted to the hub 62 and serves to retain the springs 66. As also shown in FIG. 4, the annular member 48 has a series of recesses 70 with shoulders 72 for abutting engagement with the pins 64. The recesses 70 are spaced apart by ramps 74. As also shown in FIG. 5, the hub 62 is maintained in axial position on the shaft 28 by locking pins 76 which are engaged in one of the grooves 78 or 80 in the shaft 28. The locking pins 76 are normally urged to the left in FIG. 5 by springs 82 so that their enlarged sections 84 are disposed in one of the grooves 78 or 80 to thereby prevent axial displacement of the hub 62 on the shaft 28. The locking pins 76 may be moved to the right in FIG. 5 against the force of the springs 82 so that their reduced sections 86 mate with the grooves 78,80 to thereby permit axial displacement of the hub 62 on the shaft 28.

The clutch and gearbox arrangement 26, as shown in FIG. 2, also includes a reversing gearbox 88 containing a spur gear 90 keyed to the shaft 28. The gearbox 88 also contains another spur gear 92 disposed in meshing engagement with spur gear 90. An idler shaft 94 is splined to spur gear 92 and extends outwardly from the gearbox 88. A pulley 96 is fixed to the idler shaft 94 and is aligned with the pulley 60 of the clutch 44.

A belt 98, shown in FIG. 1, is provided for making a driving connection between the pulleys 60 and 96. The belt 98 may be stored in bracket members 100 attached to the base frame 12. See also FIGS. 6 and 7.

During normal harvesting operation, the parts of the clutch and gearbox arrangement 26 are in the positions shown in FIG. 2 and the belt 98 is stored in the bracket members 100. The enlarged portions 84 of the locking pins 76 are disposed in the groove 78 in the shaft 28 so that the hub 62 is held in a driving position where the pins 64 urged into the recesses 70 in the annular member 48 and are arranged for abutting engagement with the shoulders 72. This provides a driving connection between the annular member 48 and the hub 62. The splined connection between the hub 62 and the shaft 28 then causes the shaft 28 to be rotated in the same direction A as the shaft 24. Therefore, the cutterhead 30 is driven in forward direction to cut and chop crop material delivered from the feed rolls 34,36. Meanwhile, the idler shaft 94 and pulley 96 are driven through the intermeshing spur gears 90 and 92 in an opposite direction B. With the hub 62 in the position shown in FIG. 2, flange portions 69 of the shield member 68 extend over the pulley 60 to prevent inadvertent installation of the belt 98 on the pulley 60.

Figure 3:
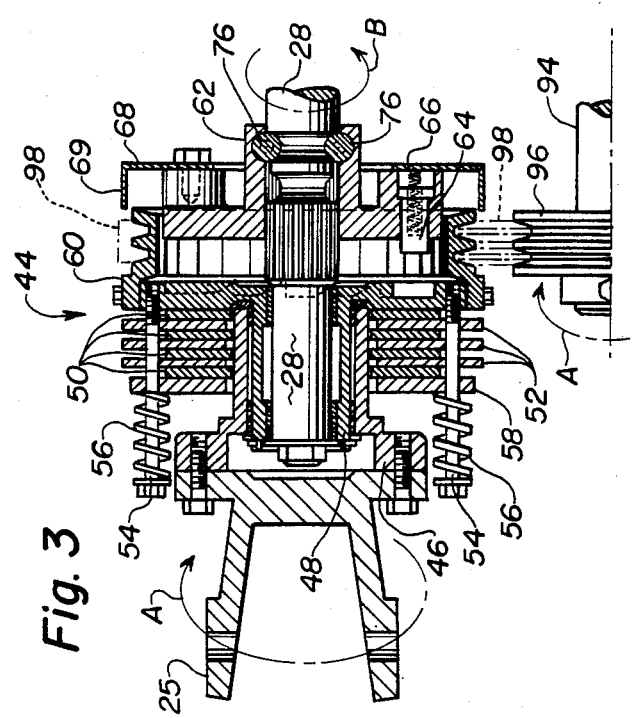
FIG. 3 is a partial view similar to FIG. 2 but with the drive parts in position for driving the cutterhead in reverse.

When it is desired to drive the cutterhead 30 in reverse direction such as to sharpen the knives (not shown) of the cutterhead 30, the locking pins 76 are manually moved to the right in FIG. 5 so that their reduced portions 86 mate with the grooves 78,80 in the shaft 28. The locking pins 76 are held in this position while the hub 62 is moved axially along the shaft 28 away from annular member 48. When the locking pins 76 are aligned with the groove 80 in the shaft 28, they are released. The springs 82 urge the locking pins 76 toward the left in FIG. 5 to thereby engage their enlarged portions 84 in the groove 80. This locks the hub 62 in a non-driving position shown in FIG. 3 where the pins 64 are removed from the recesses 70 in the annular member 48 and thus disengaged from the shoulders 72. Consequently, the hub 62 is drivingly disconnected from the annular member 48. Also in this position of the hub 62, the flange portions 69 of the shield member 68 do not cover the pulley 60.

The belt 98 is then removed from the bracket members 100 and is slipped over the pulleys 60 and 96. An idler mechanism 102, shown in FIG. 8, is provided on the base frame 12 to tension the belt 98 in order to make a driving connection between the pulleys 60 and 96. The idler mechanism 102 includes a handle 104 for pivoting an arm 106 and an idler pulley 108 upwardly toward the pulley 60. While the arm 106 and idler pulley 108 are held by the handle 104 in the phantom position shown in FIG. 8, the belt 98 is slipped over the pulleys 60 and 96. The handle 104 is then released, and a spring 110 urges the arm 106 and idler pulley 108 downwardly to tighten the belt 98 and thereby make a driving connection between the pulleys 60 and 96.

Since the pulley 60 is bolted to the annular member 48, it continues to be rotated in the same direction A as the shaft 24. This causes the pulley 96 and idler shaft 94 to also be driven in the direction A via the belt 98. The shaft 28 is then rotated through the intermeshing spur gears 92 and 90 in the opposite direction B. Therefore, the cutterhead 30 is driven in reverse direction which is particularly advantageous for sharpening the knives (not shown) of the cutterhead 30.

Additionally, the pulleys 60 and 96 may be replaced by gears, and an idler gear may be substituted for the belt 98. Such an idler gear would be engaged with the gears (replacing the pulleys 60 and 96) only when the hub 62 is in the non-driving position of FIG. 3, which will cause the shaft 28 to be rotated in the direction B in order to drive the cutterhead 30 in reverse direction.

The following claims are intended to cover all modifications and variations of the preferred embodiment of the present invention without department from the spirit and scope of the invention.

Having thus described the invention, what is claimed is:

1. In a forage harvester having a cutterhead, drive means for driving said cutterhead in a forward direction and in a reverse direction, said drive means comprising:
   (a) an input drive shaft;
   (b) a first transverse shaft connected to said input drive shaft;
   (c) a second transverse shaft having means at one end thereof for effecting a driven connection to said first transverse shaft, and said second transverse shaft connected at the other end thereof to said cutterhead;
   (d) said means at said one end of said second transverse shaft including a hub connected to and movable along said second transverse shaft between a driving position where it is drivingly connected to said first transverse shaft and a non-driving position where it is drivingly disconnected from said first transverse shaft;
   (e) a first spur gear fixed to said second transverse shaft and a second spur gear in meshing engagement with said first spur gear;
   (f) a first drive member connected to be driven by said first transverse shaft, a second drive member secured to said second spur gear, and a third drive member for making a driving connection between said first and second drive members;
   (g) means carried by said hub for preventing said third drive member from making a driving connection between said first and second drive members when said hub in said driving position.

2. The drive means of claim 1, wherein:
   (a) an annular member is connected to be driven by said first transverse shaft;
   (b) said hub carries a pin which is engaged with said annular member when said hub is in said driving position to drivingly connect said hub and said annular member; and
   (c) said pin is disengaged from said annular member when said hub is in said non-driving position to drivingly disconnect said hub and said annular member.

3. The drive means of claim 1, further comprising locking pins engageable with said hub and said second transverse shaft to hold said hub in said driving and non-driving positions.

4. The drive means of claim 1, wherein said first and second drive members each comprise a pulley, said third drive member comprises a belt, said belt may be installed on said pulleys to make a driving connection between said pulleys only when said hub is in said non-driving position.

5. The drive means of claim 1, wherein said means carried by said hub comprises a shield member with flange portions which partially cover said first drive member when said hub in said driving position to prevent installation of said third drive member on said first drive member.

* * * * *